US008025213B2

(12) United States Patent
Hartfield et al.

(10) Patent No.: US 8,025,213 B2
(45) Date of Patent: Sep. 27, 2011

(54) AUTOMATIC SETTLEMENT OF USER ACCOUNT WITH CREDITOR FROM TRANSACTION KIOSK

(76) Inventors: Sandra Hartfield, Indian Wells, CA (US); Jack Madrid, Colton, CA (US); Hamed Shahbazi, West Vancouver (CA); Roy Goncalves, New Westminster (CA)

( * ) Notice: Subject to any disclaimer, the term of this patent is extended or adjusted under 35 U.S.C. 154(b) by 1276 days.

(21) Appl. No.: 11/329,480

(22) Filed: Jan. 10, 2006

(65) Prior Publication Data
US 2007/0100750 A1    May 3, 2007

Related U.S. Application Data

(60) Provisional application No. 60/732,339, filed on Oct. 31, 2005.

(51) Int. Cl.
*G06Q 40/00* (2006.01)
*G07D 11/00* (2006.01)
*G07F 19/00* (2006.01)
*G06K 5/00* (2006.01)

(52) U.S. Cl. ............. 235/379; 235/380; 705/40; 705/43
(58) Field of Classification Search .................. 235/379, 235/380, 487, 381; 705/40, 43, 42, 35, 39
See application file for complete search history.

(56) References Cited

U.S. PATENT DOCUMENTS

| | | | | |
|---|---|---|---|---|
| 5,465,206 A | * | 11/1995 | Hilt et al. ........................ | 705/40 |
| 5,673,309 A | * | 9/1997 | Woynoski et al. ....... | 379/114.18 |
| 5,920,847 A | * | 7/1999 | Kolling et al. ................... | 705/40 |
| 5,933,816 A | * | 8/1999 | Zeanah et al. ................... | 705/35 |
| 5,987,439 A | * | 11/1999 | Gustin et al. ..................... | 705/43 |
| 6,285,991 B1 | * | 9/2001 | Powar .............................. | 705/76 |
| 6,659,340 B2 | * | 12/2003 | Siemens ....................... | 235/379 |
| 7,000,828 B2 | * | 2/2006 | Jones ........................... | 235/379 |
| 7,104,440 B2 | * | 9/2006 | Hansen et al. ................ | 235/379 |
| 7,668,766 B1 | * | 2/2010 | Goodwin et al. ............... | 705/35 |
| 2002/0038289 A1 | * | 3/2002 | Lawlor et al. ................... | 705/42 |
| 2002/0082994 A1 | * | 6/2002 | Herziger ......................... | 705/43 |
| 2002/0156734 A1 | * | 10/2002 | Yamamoto ...................... | 705/43 |
| 2003/0141360 A1 | * | 7/2003 | De Leo et al. ................ | 235/379 |
| 2003/0141372 A1 | * | 7/2003 | Brown et al. ................. | 235/487 |
| 2004/0210515 A1 | | 10/2004 | Hughes | |
| 2005/0010478 A1 | | 1/2005 | Gravelle | |
| 2005/0177510 A1 | * | 8/2005 | Hilt et al. ........................ | 705/40 |
| 2007/0063016 A1 | * | 3/2007 | Myatt et al. ................... | 235/379 |
| 2007/0214078 A1 | * | 9/2007 | Coppinger ...................... | 705/39 |
| 2008/0003977 A1 | * | 1/2008 | Chakiris et al. ............... | 455/407 |

OTHER PUBLICATIONS

U.S. Patent and Trademark Office acting as an International Searching Authority, "International Search Report" (Form PCT/ISA/210) for International Application No. PCT/US2006/060383, Mar. 24, 2008, 4 pages.

(Continued)

*Primary Examiner* — Thien Mai
(74) *Attorney, Agent, or Firm* — HKH Law, LLC

(57) ABSTRACT

A transaction kiosk collects cash from a user and then electronically negotiates with the user's creditor to settle a balance on an account with the creditor. The bank recognizes the cash deposited in the transaction kiosk by the user as security for the settlement amount. The cash deposited in the transaction kiosk is considered a cash asset owned by the bank and available to satisfy depositor claims. A transaction processor brokers the transaction between the user of the transaction kiosk, the surety bank, and the creditor.

23 Claims, 5 Drawing Sheets

OTHER PUBLICATIONS

U.S. Patent and Trademark Office acting as an International Searching Authority, "Written Opinion of the International Searching Authority" (Form PCT/ISA/237) for International Application No. PCT/US2006/060383, Mar. 24, 2008, 7 pages.

* cited by examiner

AUTOMATIC SETTLEMENT OF USER ACCOUNT WITH CREDITOR FROM TRANSACTION KIOSK

CROSS REFERENCE TO RELATED APPLICATIONS

This application claims priority pursuant to 35 U.S.C. §119(e) to U.S. provisional application No. 60/732,339 filed 31 Oct. 2005, which is hereby incorporated herein by reference in its entirety.

BACKGROUND

Automated teller machines (ATMs) and quick cash or money machine kiosks have become ubiquitous. ATMs are often owned by banks (proprietor banks) and provide a variety of banking services twenty-four hours a day without need for interaction with a customer service representative from the proprietor bank. The services available at an ATM are available not only to a proprietor bank's own customers, but to anyone who has an account at a bank that participates in a common network with other proprietor banks. Today, the networks are so broad-reaching that almost anyone with a bank account can conduct banking transactions at most ATMs in the world. ATM services include the provision of account balance information, balance transfers between bank accounts, cash withdrawals from bank accounts (often for a transaction fee), and cash or check deposits to bank accounts. Some ATMs also allow the initiation of money transfers from the account of a bank customer in settlement of the account of a creditor. Deposits are generally collected by instructing the customer to place any cash and/or checks into an envelope and to insert the sealed envelope into a receptacle. The customer indicates the amount of the deposit by data input on a keypad on the ATM. The deposit information entered by the customer is later reconciled with the cash and/or checks in the deposit envelope at the proprietor bank.

ATMs are generally serviced by armored transport services in the employ of the bank that is the proprietor of the particular ATM. The armored transport service collects the deposit envelopes and replenishes the cash dispensing mechanism in the ATM with currency from the proprietor bank or a correspondent bank. The deposit armored transport service returns the deposit envelopes to the proprietor bank or a correspondent bank. Once counted, cash in the deposit envelopes is considered cash available to the proprietor bank, even if still physically held by a correspondent bank, as part of its cash reserves available to satisfy its customers' claims. The bank's cash reserve is often termed "vault cash." Any checks from the deposit envelopes are presented by the proprietor bank to the banks of the drafters for payment. The proprietor bank then participates in an electronic settlement with the banks of the ATM users.

Cash or money access machines are found in many commercial establishments such as bars and convenience stores that either conduct a significant volume of cash transactions or desire to offer access to cash for the convenience of their customers. Such money access machines are generally owned by either the proprietors of the establishment where the machines are located or a third party owner of the money access machines leases space in the establishment. The owner of a money access machine may generate revenue by charging a transaction fee to the user for the convenience of access to cash. The user's bank account is thus debited not only the cash withdrawal amount, but a transaction fee as well, and the sum of those amounts is credited to the bank account of the money machine owner. The money access machines generally do not provide the extensive banking services that ATMs offer and instead usually only provide a user access to cash with corresponding account balance information. The money access machines are similarly generally serviced by an armored transport service that brings money from the owner's bank account to stock the machine.

In order to operate, both the ATMs and cash access machines (which for the sake of convenience are hereinafter referred to collectively as "banking machines" unless one or the other is particularly indicated) must be connected to an information network for the reciprocal transfer of information from the banking machine to the bank of the user. In order for a user to make a cash withdrawal, the banking machine must first contact the user's bank to determine whether the user has enough funds in an account to secure the cash withdrawal. Funds will ultimately be debited from the user's account and credited by the user's bank to the bank of the banking machine owner (which may be a proprietor bank) by network transfer or otherwise reconciled. When a user makes a deposit at an ATM owned by the user's bank, the user's account is credited with the deposit amount to ultimately be confirmed after reconciliation when the deposit envelope is opened. Alternately, when a user of an ATM makes a deposit in a proprietor bank's ATM that does not hold the user's account, but has an affiliation with the user's bank, the ATM may contact the user's bank to notify the user's bank that the user's account should be credited with the deposit amount to ultimately be confirmed after reconciliation when the deposit envelope is opened after transfer to the user's bank.

The information networks linking banking machines and banks are generally provided or facilitated by a third party transaction processor. The transaction processor may operate the physical information network used by the banking machines and may further provide the necessary hardware and software used by the banking machines and banks to communicate with each other over the network. Transaction processors also provide other communication services, for example, transaction services between banks and creditors of account holders for automatic payment of bills, and transaction services between credit card issuers, merchants, and the merchant's banks.

Perhaps incredibly, even now in the twenty-first century approximately thirty percent of the population of the United States does not own a bank account and operates financially on a cash only basis. Many of these people are in lower income brackets and often are recent immigrants. For these classes of society, conducting business with traditional financial institutions, e.g., banks, is often difficult and is sometimes unavailable as an option for managing personal finances. Difficulties may arise from, for example, a lack of transportation to reach the financial institution to conduct business, a language barrier, a fear of identification arising out of immigration issues, or different cultural norms. For many, traditional banking options are unavailable due to poor credit histories or a lack of credit history at all. Electronic banking and other electronic financial services, for example, internet banking and automatic bill payment, are often unavailable to this population merely from the fact that they do not have access to computers or Internet connections. Further, since they do not have bank accounts, they are unable to write a check to be drawn on an account and send it to a creditor in settlement of the debt.

At present there is no opportunity for a person without a bank account to take advantage of the ease and convenience of a banking machine to perform financial transactions. The primary problem is the inherent credit risk that no party involved in such a transaction is willing to undertake. A bank is generally unwilling to guarantee payment to a creditor of a customer unless that customer has sufficient funds deposited within his bank account. A bank is definitely unwilling to extend credit to or guarantee payment to a third party creditor of a person without an account because there is no security for transaction. While a transaction processor has relationships with both banks and creditors, the transaction processor is not in the business of extending credit itself or receiving security for a transaction. The transaction processor merely provides a service as an information broker or facilitator for the banks and creditors.

The information included in this Background section of the specification, including any references cited herein and any description or discussion thereof, is included for technical reference purposes only and is not to be regarded subject matter by which the scope of the invention is to be bound.

SUMMARY

Currency-based transaction kiosks are provided for access by users through which the users can pay bills without the requirement of having a bank account. The transaction kiosks may be retrofitted ATMs or cash machines or kiosks purposefully built to accommodate the contemplated transactions. Unlike normal banking machines, the transaction kiosks have a currency collector, similar to the currency collector of a vending machine, that reads and validates cash inserted therein. After insertion and validation the cash is placed within a vault in the transaction kiosk. At least the vault in the transaction kiosk is owned by a surety bank willing to pay the user's bill, regardless of who may own the rest of the transaction kiosk. The vault is locked and secure and access is available only to the surety bank and its agents. The cash deposited into the transaction kiosk is considered part of the surety bank's cash-on-hand, even though it may be remotely located from the main surety bank location or other physical branches. The surety bank considers the cash deposited by the user as security for the surety bank's settlement of the user's account with a creditor on the user's behalf.

A method of allocating moneys owned and controlled by a bank is also described. In this method, a first amount of a cash deposited by a user is validated at a remote transaction location. The cash deposit is physically secured at the transaction location. The transaction location transmits information regarding the first amount of the cash deposit physically secured at the transaction location to the bank to update a record of a second amount of cash available to the bank to satisfy depositors' claims by including the first amount within the second amount.

A method for the instantaneous settlement of an account of a debtor with a creditor by a bank on behalf of the debtor is additionally described herein. In this method, a first amount of a cash deposit is validated by the debtor at a transaction location. The transaction location transmits information regarding the first amount of the cash deposit physically secured at the transaction location to the bank to update a record of a second amount of cash available to the bank to satisfy depositors' claims by including the first amount within the second amount. The bank then extends a promise to the creditor to pay the account of the debtor. Risk to the bank is avoided because the promise is secured by the validated first amount of the cash deposit.

A system that enables a surety bank to conduct a transaction to settle an account between a debtor and a creditor includes a transaction kiosk for convenient access by the debtor. The transaction kiosk has a user interface, a cash collection device, a cash value validation device, and a vault separately owned by the surety bank. The system also includes a transaction processor system, a surety bank system, and a creditor system. The transaction processor system is connected with each of the transaction kiosk, the surety bank system, and the creditor system via a communication network. The transaction processor system facilitates communications between the transaction kiosk, the surety bank system, and the creditor system over the network to settle the account of the debtor with the creditor.

A transaction kiosk for accepting and validating cash, settling accounts with creditors, or performing other electronic banking functions comprises components similar to traditional banking machines, for example, a user interface, a money deposit component, a money withdrawal component; and a vault. However, ownership of the transaction kiosk is split. A bank owns the vault, including any money within the vault, and a second party owns the remainder of the transaction kiosk. The transaction kiosk also has an automatic cash collection component, an automatic cash recognition component, and an automatic cash value validation component. These may be separate components or combined in one automated currency receptacle device.

Other features, details, utilities, and advantages of the present invention will be apparent from the following more particular written description of various embodiments of the invention as further illustrated in the accompanying drawings and defined in the appended claims.

DETAILED DESCRIPTION OF THE INVENTION

A convenient system and method for settlement with creditors using currency-based transaction kiosks without requirement of a traditional bank account is described in detail herein. In general, the system uses a currency-based transaction kiosk to collect currency from a user of the kiosk who is a debtor of a creditor and then electronically transact with the user's creditor via a transaction processor to settle the balance on an account, while recognizing the cash deposited in the transaction kiosk by the user as security. A bank, for example, a nationally chartered bank or other depository institution, acts as a surety and guarantees payment to the user's creditor; the guarantee is secured by the cash deposited in the transaction kiosk; and the transaction processor brokers the transaction between the user of the transaction kiosk, the surety bank, and the creditor. An exemplary system and corresponding methodology for implementing this inventive transaction scheme are further described below with respect to the accompanying figures.

Figure 1:
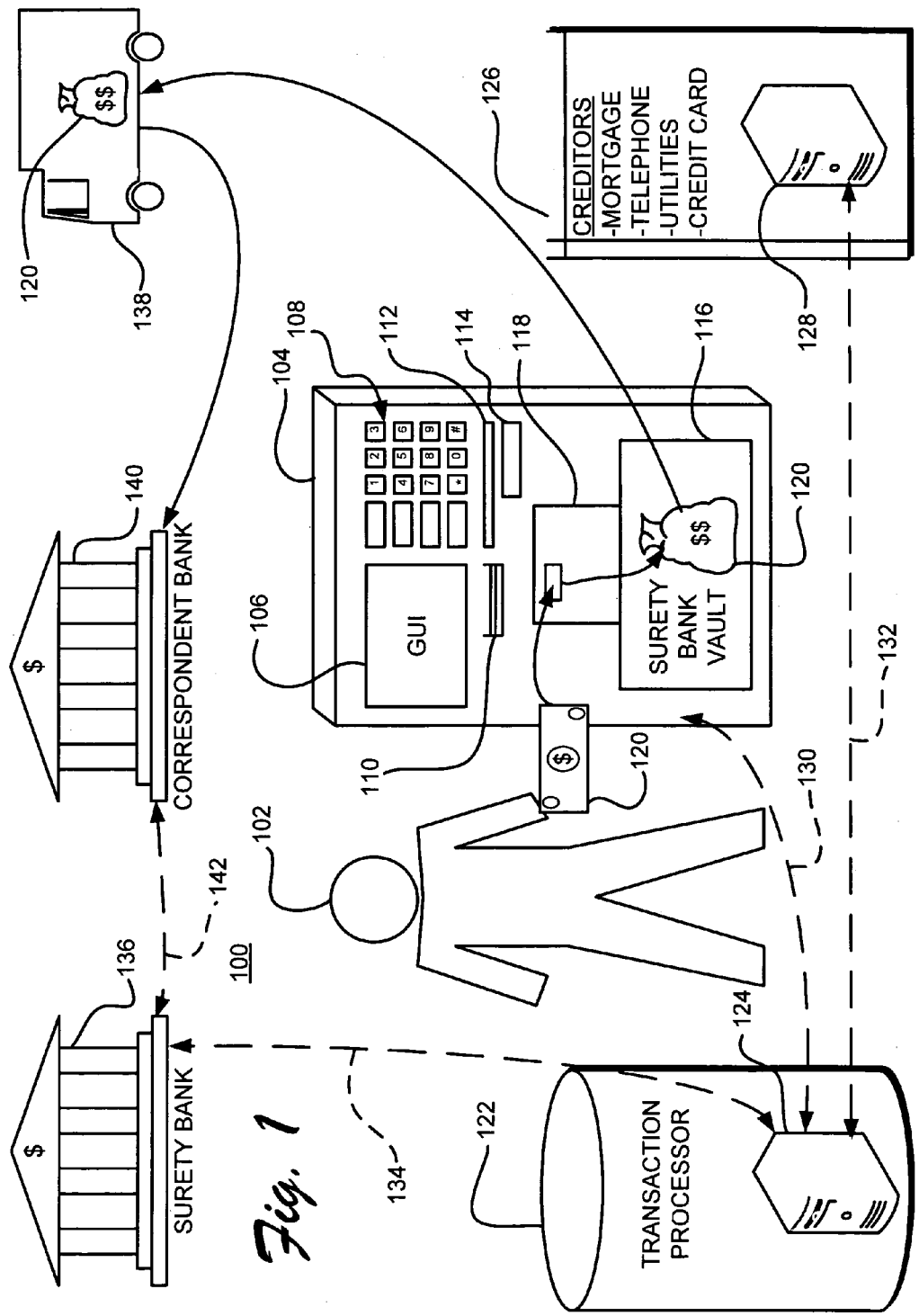
FIG. 1 is a schematic depiction of an exemplary cash deposit transaction at a transaction kiosk and the immediate posting of payment to a creditor.

FIG. 1 is a schematic depiction of an exemplary system 100 for the automatic settlement of a user account with creditor from a transaction location. In FIG. 1 a user 102 is shown interfacing with a transaction location, in this embodiment a transaction kiosk 104. The transaction kiosk 104 is similar in many respects to well-known ATMs and cash access machines that are ubiquitously located. The transaction kiosk 104 includes a graphical user interface 106 (GUI) (i.e., a display screen), a data entry and option selection keypad 108, a magnetic reader 110 for access, credit, and debit cards, a cash dispenser 112, and a receipt dispenser 114 similar to most other ATMs or money access machines. The transaction kiosk 104 of the present invention also has a vault 116, which is physically similar to vaults at ATMs, but is functionally different as will be explained further herein.

The transaction kiosk 104 is connected with a transaction processor 122 via a first network 130. The transaction processor 122 maintains a computer system 124 with sufficient data processing and storage capabilities to accommodate the expected number of transactions. The computer system 124 of the transaction processor 122 interfaces with potentially thousands of transaction kiosks 104 via the first network 130 to broker millions of cash withdrawals and other banking transactions on a daily basis. The transaction processor 122 is also connected with a plurality of creditors 126 via a second network 132 linking the computer system 124 of the transaction processor 122 to computer systems 128 of the creditors 126. The creditors' computer systems 128 are similarly equipped with significant data storage and processing capabilities in order to manage millions of credit transactions, e.g., credit and debit card transactions, on a daily basis, which are facilitated by the transaction processor 122. Exemplary creditors of a user 102 may be mortgage companies, wireless and other communications companies, utility companies, and credit card companies, as indicated in FIG. 1, or any other vendor or service provider with which a user 102 may have an account. The transaction processor 122 is further connected with one or more surety banks 136 via a third network 134. The first, second, and third networks 130, 132, 134 may be, for example, local area networks (LANs) or wide area networks (WANs); public or private; analog or digital; telephonic, cable, wireless, or the Internet. The first, second, and third networks 130, 132, 134 may comprise the same or overlapping networks. The data carried may be packet switched, modulated, compressed, encrypted, or otherwise modified for transmission.

The transaction processor 122 brokers the information exchange between a banking machine and the particular bank of the user to effect the appropriate postings corresponding to the transaction performed by the user. For example, if a user wants to make a cash withdrawal, the transaction broker 122 receives the user's identification, account information, and withdrawal request from the banking machine and forwards the withdrawal request to the user's bank. The user's bank determines whether there are sufficient funds in the user's account to secure the cash withdrawal requested. If approved, the user's bank responds to the transaction processor 122 with approval and account balance information. The transaction processor 122 then relays the approval and balance information to the banking machine, which then dispenses cash to the user and a receipt with balance information. The transaction processor 122 further brokers settlement transactions between a surety bank 136 and a creditor 126 of a user on behalf of the user without requirement of any user bank account as further described below.

Another feature of the transaction kiosk 104 is that it includes a currency or bill collector and validation component 118. The currency collector 118 automatically accepts currency 120 from the user 102, optically identifies the nature and denomination of the currency 120, and validates the amount deposited into the transaction kiosk 104. Currency can include any combination of cash, such as bills and coins, coupons, checks, gift certificates, prepaid convenience cards (as defined later herein) any other negotiable instrument with a cash equivalent value able to secure a transaction. It is further contemplated that in addition to depositing currency, a user that does have a bank account or a credit card can similarly secure a payment transaction with a creditor with a debit or credit card. Once the currency is validated, it is transferred into a vault 116 within the transaction kiosk 104.

The vault 116 is unlike vaults in ATMs or money access machines in several respects. First, in comparison to money access machines, while both the transaction kiosk 104 and a money access machine hold cash for dispensation to a user, the vault 116 of the transaction kiosk 104 further holds deposited cash while a money access machine accepts no deposits. Second, in comparison to ATMs, while both the transaction kiosk 104 and an ATM hold both dispensation cash and deposited cash, cash 120 deposited in the vault 116 through the currency collector 118 in the transaction kiosk 104 is a known and fully reconciled quantity, whereas any cash deposited in an ATM is contained in envelopes and is ultimately an unknown quantity until removed from the ATM and manually reconciled with the stated deposit amount. Thus, in contrast to banking machines, the cash deposits of a user 102 are verified independently of the user 102.

The currency collector 118 may also operate as a cash recycler. A cash recycler mechanism dispenses cash that was previously accepted by the currency collector 118. Thus, any bills or other currency accepted by the cash collector 118 can be dispensed for withdrawal by users. This allows the transaction kiosk to potentially become self-sufficient with regard to funds held in the vault 120 or at least potentially reduce the frequency with which the vault 120 needs to either be emptied or replenished to accommodate withdrawal transactions.

In an alternative implementation, the transaction kiosk 104 may be operated by an intermediary to the user. For example, the transaction kiosk 104 may be in the form of a money exchange safe product. Such safe products are often found in convenience stores. Clerks interface with the safe product via a transaction register machine, which has taken the place of cash registers in many stores. The register machine records the transaction and interfaces with the safe machine to determine an amount of money needed for output in order to make change if necessary. The clerk deposits funds received from a customer into the safe product rather than a drawer in the register machine, making those funds inaccessible to the clerk. The safe product is often equipped with a bill reader/currency collector 118 to monitor the veracity of deposits by the clerk based upon the transaction information. Thus, the store clerk has no access to funds beyond what is required for making change in a particular transaction or for a small number of transactions.

In addition to documenting the transaction, in the context of the present discussion, the register machine may also be used as the GUI 106 and data entry interface 108 and, in conjunction with the safe product, functions as a transaction kiosk 104. In this implementation, the store clerk may act as an intermediary to and on behalf of the user to enter the necessary information to conduct an account settlement transaction using this form of a transaction kiosk 104.

A further feature of the vault 116 of the transaction kiosk 104 is that it is owned by a surety bank 136 regardless of the ownership of the rest of the transaction kiosk 104. While many banks own their own ATMs, most money access machines are either independently owned by businesses that place them in commercial establishments pursuant to a lease or are owned by the commercial establishments themselves. The surety bank 136 owns all right, title, and interest in and to the vault 116, and any and all currency 120 therein without any conditions, in a transaction kiosk 104 that is otherwise owned by a third party. The vault 116 is locked and secure and access is available only to the surety bank and its agents. Ownership of the vault 116 is generally acquired by the surety bank 136 from the owner of the transaction kiosk 104 via contract. The importance of ownership of the vault 116 in a transaction kiosk 102 by the surety bank 136 will become clear through the discussion of the method for operating the system 100 as described further below.

Recall that, at present, only persons with banking accounts can access funds through a banking machine or otherwise conduct transactions. These persons must have adequate funds within their accounts to secure the cash withdrawal or any other transaction they choose to make. Obviously, a person without funds in an account somewhere cannot access cash from a banking machine because there is no security for the advance. Note also that even if a user makes a deposit at an ATM, funds corresponding to such a deposit are not available to secure any other transaction until the funds have been physically removed from the ATM and manually reconciled. In other words, banks do not generally trust a user that the deposit amount keyed into the ATM user interface is the actual amount contained in the deposit envelope. Thus a user cannot contemporaneously deposit funds in an ATM and then attempt to use the deposited funds as security for another transaction, e.g., payment of a bill. Manual reconciliation of the deposit is first required.

FIG. 1 depicts a system with relationships for allowing a user 102 without a bank account to pay the bills of a creditor 126 using a transaction kiosk 104. This user 102 need not have any relationship or account with any bank. However, a surety bank 136 that owns the vault 116 in the transaction kiosk 104 will guarantee payment of a bill to a creditor 126 of the user 102. The account with the creditor 126 is settled immediately by the transaction processor 122, with actual remittance from the surety bank 136 to the creditor 126 to follow. Other transactions contemplated in the present invention include the generation of money orders and wire transfers for a transaction fee. Note that the user 102 never becomes a customer of the surety bank 136, no account with the surety bank 136 is accessed, and no account with the surety bank 136 is created by the transaction. Further, settlement with the creditor 126 can occur instantly or with only a short delay via the communication brokered by the transaction processor 122, before the actual cash 120 deposited by the user 102 is ever physically transferred from the transaction kiosk 104 to the surety bank 136.

This transaction is possible due in part to each of the following: the ability of the transaction kiosk 104 to receive and validate cash 120, the ownership of the vault 116 by the surety bank 136, the relationship between the transaction processor 122 and the surety bank 136, and the relationship between the transaction processor 122 and various creditors 126. The receipt and validation of cash 120 at the transaction kiosk 104 is important because there needs to be some confirmation that any settlement transaction between the surety bank 136 and a creditor 126 is secured by an adequate amount of cash 120. The ownership of the vault 116 in the transaction kiosk 104 by the surety bank 136 is also important from a security standpoint. If the surety bank 136 did not own the vault 116, it would not own the cash 120 in the vault 116 and thus could not consider the cash 120 in the vault 116 as available to satisfy its depositors. In such a case, any payment by the surety bank 136 to a creditor of a user 102 would be tantamount to an unsecured loan with the surety bank 136 relying on repayment through relationships with third party owners of the transaction kiosks 104. This scenario is a risk that banks are unwilling and perhaps not allowed to take pursuant to banking regulations. However, through the novel constructs of the present invention, the cash 120 in the surety bank-owned vaults 116 of transaction kiosks 104 in remote locations is leveraged to provide the necessary security for the creditor transactions.

The relationship of the transaction processor 122 with the surety bank 136 and the creditors 126 is also important. In fact, the transaction processor 122 is a service provider to both the surety bank 136 for banking machine transactions and creditors 126 for credit card transaction and processing services. Thus, the transaction processor 122 can operate as a middle-man to bring together surety bank 136 and the creditor 126 that otherwise may not have had a prior relationship. The transaction processor 122 also controls the necessary network infrastructure, e.g., the first, second, and third networks 130, 132, 134 depicted in FIG. 1 to enable electronic transactions between the transaction kiosk 104, the surety bank 136, and the creditors 126.

Figure 2:
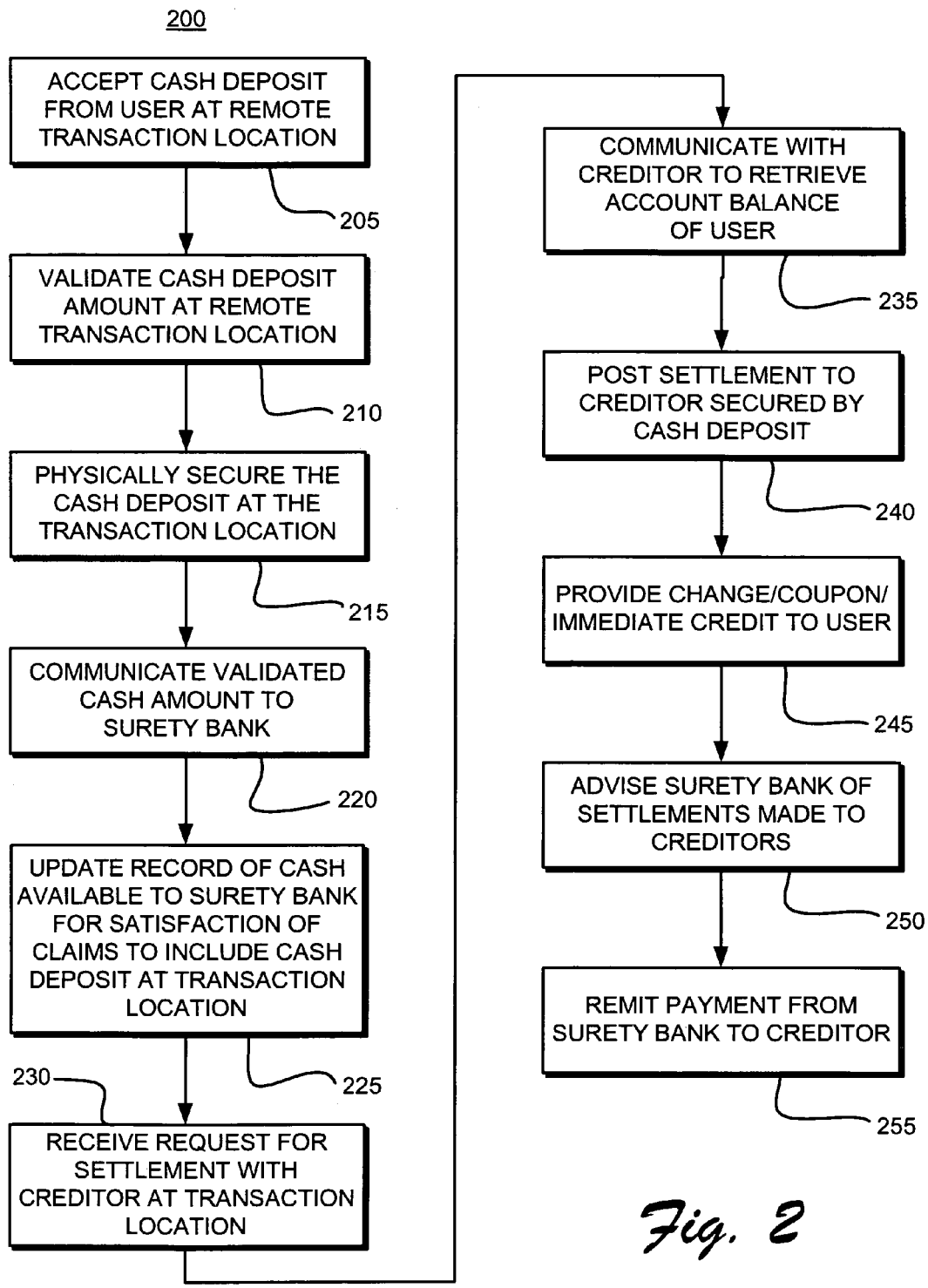
FIG. 2 is a flow diagram of a series of exemplary operations involved in accepting a cash deposit at a transaction kiosk from a user and posting a payment to a creditor of the user.

FIG. 2 depicts an exemplary process 200 for conducting a settlement transaction between a user 102 of the transaction kiosk 104, the transaction processor 122, a creditor 126 of the user, and the surety bank 136. Initially, in step 205, the transaction kiosk 104 accepts a cash deposit from a user at a location remote from the surety bank 136. The amount of the currency 120 deposited is validated by currency collector 118 in the transaction kiosk 104 in the remote location, step 210. Once validated, the cash 120 is physically secured within the transaction kiosk 104 by transferring the cash 120 from the currency collector 118 to the vault 116. Once the amount of cash 120 deposited by a user 120 is validated at the transaction kiosk 104, the validated amount is communicated from the transaction kiosk 104 to the surety bank 136 by the transaction processor 122 over the first network 130 and the third network 130. The surety bank 136 then updates its ledger by posting the cash 120 deposited and validated at the transaction kiosk 104 for inclusion in its calculation of funds available to satisfy depositor claims.

The transaction process 200 of FIG. 2 continues in step 230 wherein the transaction processor 122 receives a request for settlement of an account balance with a creditor 126 from the transaction kiosk 104 over the first network. The transaction processor 122 then communicates with the creditor 126 over the second network 132 to retrieve the account balance of the user 102, step 235. Presuming the cash deposited by the user is adequate to settle the account balance, balance due, or minimum payment required, the transaction processor 122 posts the settlement to the creditor 126, step 240. Any deposit of the user 102 into the transaction kiosk 104 in excess of the balance with the creditor 126 and any applicable transaction fee is immediately refunded or otherwise credited to the user 120, step 245. The transaction processor 122 advises the surety bank 136 periodically, for example, once a day, of the transactions completed including, for example, identification of the creditors to be paid, accounts to be credited, and amounts due, step 250. Alternatively, the transaction broker 122 may contemporaneously communicate with the surety bank 136 via the third network 134 to request approval for settlement of the account balance with the creditor 126 on behalf of the user 102. Once approval is received from the surety bank 136, the transaction processor 122 posts the settlement to the creditor 126 in the form of a promised payment from the surety bank 136. In either case, the surety bank 136, either at the time of the transaction or at some later reconciliation point, remits actual payment of the account balance to the creditor 126, step 260, which is secured by the cash 120 held in the vault 116 of the transaction kiosk 104.

Figure 3:
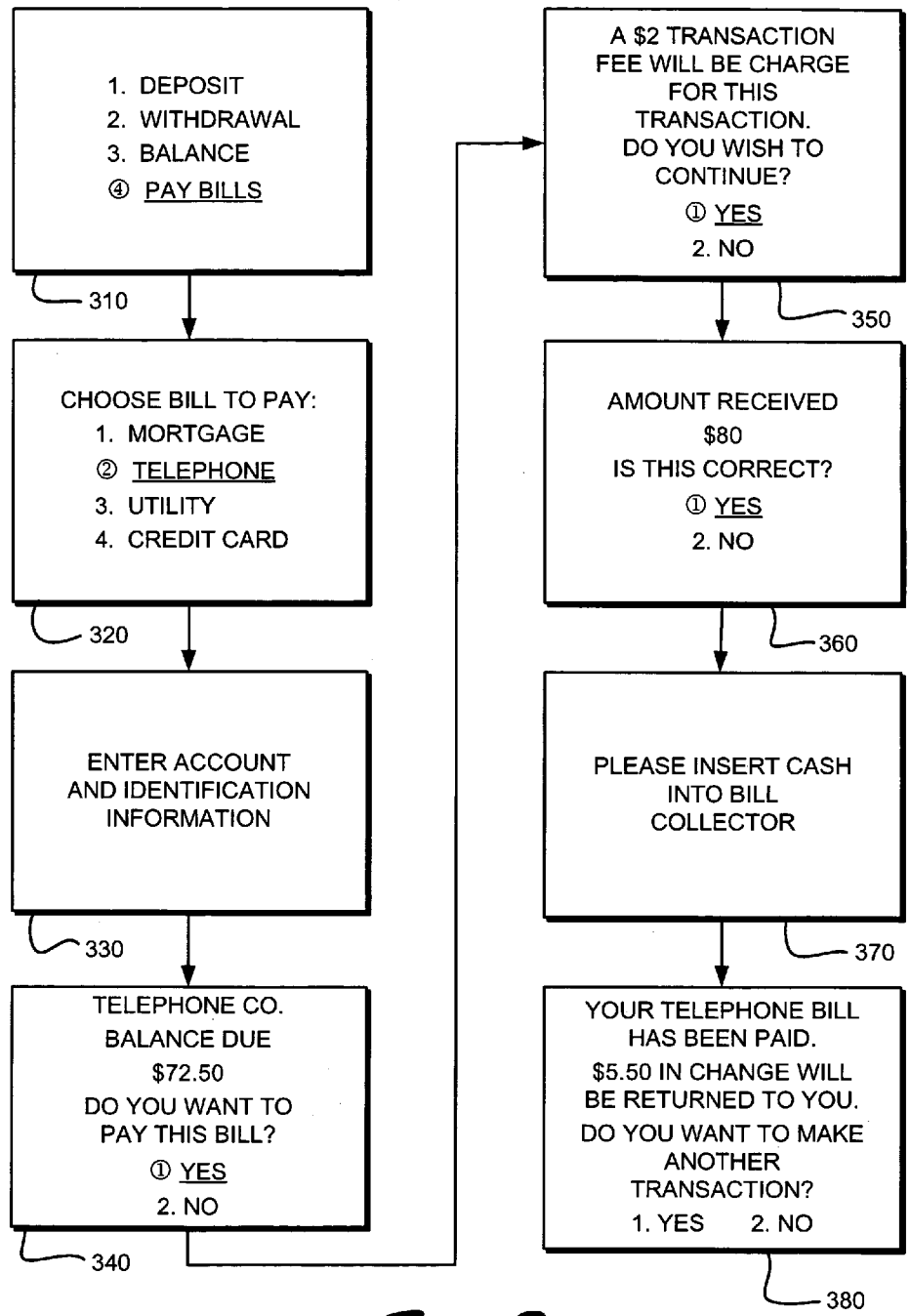
FIG. 3 illustrates a computer processing system that may be useful in implementing the described technology.

FIG. 3 depicts a series of exemplary GUI messages displayed on the GUI 106 of the transaction kiosk 104 to a user 102 while conducting a bill payment transaction according to the present invention. A first GUI message 310 of the transaction kiosk 104 presents the user 102 with several transaction options, for example, to make a deposit, to make a cash withdrawal, to view an account balance, and to pay a bill. It should be apparent by the selections offered in the first GUI message 310 that this transaction kiosk 104 has the additional functionality of an ATM in that it provides for several common banking transactions as well as transactions according to the present technology. In the first GUI message 310, the "pay bills" option has been selected by a user, for example, by pressing a number associated with the selection option on the data entry keypad 108 of the transaction kiosk 104.

When the "pay bills" option is selected from the first GUI message 310 by the user 102, a second GUI message 320 is presented to the user 102. The second GUI message 320 asks the user 102 which of several types of bills the user 102 may wish to pay, for example, a mortgage, a telephone bill, a utility bill, or a credit card bill. Depending upon the relationship between the transaction processor 122 and the creditors 126, many different types of creditors 126 may be listed on the second GUI message 320; alternatively, exclusivity may be provided to creditors in particular product or service categories for participation in the transaction settlement system 100. In the exemplary second GUI message 320, the user 102 has chosen to pay a telephone bill.

The GUI 108 then displays a third GUI message 330 asking the user 102 to enter their telephone account information and or any personal information necessary for the transaction processor 122 to retrieve the account balance information of the user 102 from the particular creditor 126. Once the user 102 enters the necessary account information, a fourth GUI message 340 is presented stating the account balance from the user's telephone company as reported to the transaction processor 122 from the creditor 126. In this example, the amount of the telephone bill is $72.50. The fourth GUI message 340 then asks the user 102 whether he in fact wants to pay the identified bill. As shown in the fourth GUI message 340, the user 102 has confirmed his intention to pay the bill by selecting the "Yes" option through a corresponding entry on the data entry keypad 108. The GUI 106 on the transaction kiosk 102 then presents a fifth GUI message 350 to the user 102 indicating that a transaction fee, of $2 in this example, will also be charged. The fifth GUI message 350 again requests confirmation of the user's intent to complete the transaction. As depicted in the fifth GUI message 350, the user 102 has confirmed his intent to continue the transaction by selecting the "Yes" option.

An exemplary sixth GUI message 360 requests that the user 102 insert cash 120 into the currency collector 118. As the user 102 places cash into the currency collector 118, it optically scans or otherwise interrogates the inserted bills to determine their value. Once each bill is validated, it is placed into the vault 116 within the transaction kiosk 104. Once the user has inserted the necessary cash 120 into the currency collector 118, a seventh GUI message 370 appears indicating the amount of cash 102 validated by the currency collector 118 and asking the user to confirm the accuracy of the amount. As shown in the seventh GUI message 370, the user 102 in this example has validated that $80.00 was inserted into the currency collector 118. Once a sufficient amount of cash 120 is collected and validated to secure payment of the user's account with the creditor 126, the transaction kiosk 104 communicates this information to the transaction processor 122, which in turn communicates a request to settle the user's account with the creditor 126 and simultaneously requests approval of the surety bank 136 to assume liability for payment of the user's bill. When approval from the surety bank 136 is received, the transaction processor 122 settles the account with the creditor 126 and notifies the transaction kiosk 104 that the user's account has been settled.

An eighth GUI message 380 is then displayed to the user 102 indicating that the bill has been paid. Note that the user 102 placed $80 into the transaction kiosk 104, but the sum of the account balance for the telephone bill and the transaction fee totaled only $74.50. Thus a sum of $5.50 must be returned to the user 102 in some form. Because the user 102 does not have a bank account, there is no option to merely credit the excess deposit amount to an account. Several options for such a refund are available. For example, the transaction kiosk 104 may be equipped with a change machine to provide payment of excess deposits directly to the user. Alternatively, the excess deposit may be retained by the creditor 126 as a credit to the user's account with the creditor 126 for application to future balances with the creditor 126. Another option is to issue a coupon to the user 102 in the amount of the excess deposit good for purchases of goods and services of interest to the user 102. For example, if the transaction kiosk 104 is owned by and located in a convenience store, a coupon good toward purchases in the convenience store may be issued to the user 102 of value equal to or greater than the amount of the excess deposit.

Yet another option may be to issue or credit a prepaid convenience card with funds available for application toward or purchase of pods or services. The term "prepaid convenience cards" is a generic term to cover a variety of different prepaid card products offered under various names, for example, prepaid credit cards, prepaid debit cards, guaranteed approval cards, telephone calling cards, store credit cards, gift cards, and other cards with cash value attached. In fact, a coupon could be considered a type of paper prepaid convenience card. Building upon the example of FIG. 3 in which a telephone bill was paid, the excess deposit amount could be placed on a prepaid telephone calling card and issued to the user 102 for future use when placing long distance calls. A prepaid convenience card with funds applicable toward the purchase of other goods and services anywhere, for example, groceries, gasoline, or goods sold by the owner of the transaction kiosk 104, is also a possible refund option. The eighth GUI message 380 may further ask the user 102 whether another transaction is desired, for example, payment of another bill.

Returning to FIG. 1, the actual physical transfer of the cash 120 from the transaction kiosk 104 is also depicted to provide an understanding of the complete path of the cash 120. Periodically, the cash 120 in the surety bank' vault 116 in the transaction kiosk is emptied by an armored transport company 138 contracted by the surety bank 136 as an agent of the surety bank 136 to provide this service. Note that the contract between the armored transport company 138 and the surety bank 136, not the owner of the transaction kiosk 104. Again, this is because all of the cash 120 in the kiosk is owned by the surety bank 136. Part of the service provided by the armored transport company 138 is a security guarantee and insurance that the amount of funds removed from the transaction kiosk 104 will be safely transported to the surety bank 136 or its designee. Because of this surety guarantee from the armored transport service, applicable banking rules and regulations allow the surety bank 136 to consider the cash 120 as owned and held by the surety bank 136 even during transport.

Often for purposes of convenience, the armored transport company will transport the cash 120 to another bank, not the surety bank 136. This other bank is considered a correspondent bank 140 and most banks have reciprocal arrangements of this sort. For example, if the surety bank 136 is located in Arizona but owns a vault 116 in a transaction kiosk 104 located in Idaho, it is impractical for the armored transport service 138 to transport the cash 120 from Idaho to Arizona. Therefore, the armored transport service 138 will transport the cash 120 to a local, federally insured, correspondent bank 140 in Idaho. Even though the cash 120 is now physically held by the correspondent bank 140, under applicable laws and regulations, the cash 120 is still considered owned by the surety bank 136. Further, because both the correspondent bank 140 and the surety bank 136 are federally insured, the surety bank can continue to consider the cash 120 physically held at the correspondent bank 140 as cash assets of the surety bank 136 available to satisfy its depositors' claims.

The surety bank 136 and the correspondent bank 140 will then periodically reconcile funds held as correspondent banks. In some instances when holding an excess of cash owned by other banks, the correspondent bank 140 may transport excess funds to a local federal reserve bank in Idaho. The surety bank 136 may then transport funds from a local federal reserve bank in Arizona corresponding to cash 120 remove from vaults 116 in transaction kiosks 104. Thus, the cash 120 securing the settlement payments by the surety bank 136 to the creditors 126 of users 102 of the transaction kiosks 104 with vaults 116 owned by the surety bank 136, as well as the transaction fees charged to such users 102, may ultimately be physically located at the surety bank 136. Again, the transaction fees may ultimately be split between the surety bank 136, the transaction processor 122, and the owner of the transaction kiosk 104 containing the vault 116 owned by the surety bank 136. Thus the transaction according to the present invention to settle the bills of a user 102 with a creditor 126 by a surety bank 136 is completed.

Figure 4:
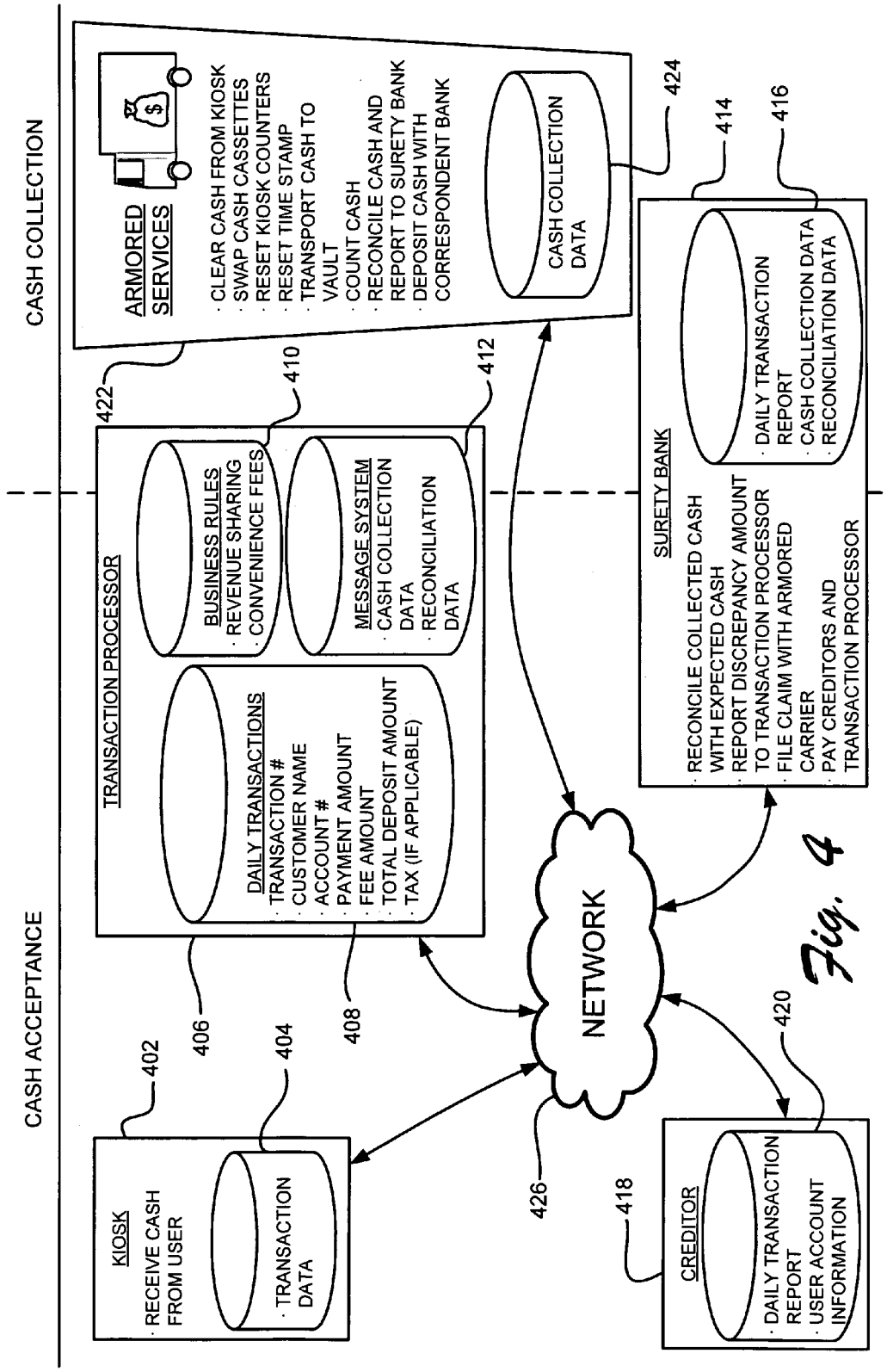
FIG. 4 schematically depicts a sequence of exemplary graphical user interface screens for guiding a user of the transaction kiosk through the steps of a transaction.

FIG. 4 is an exemplary environment of data exchange and cash movement for settling an account of a user via a transaction kiosk 402. Functions related to or based upon cash deposited and validated at the transaction kiosk 402 are depicted on the left side of the dashed line. Functions based upon or occurring after physical collection of cash from a transaction kiosk 402 are depicted on the right side of the dashed line. As indicated, several of the functions performed by and/or the data collected by the surety bank system 414 and the transaction processor system 406 are based upon one, the other, or both the validated cash deposit and the cash collection data. Thus, the surety bank system 414 and the transaction processor system 406 are depicted as straddling the dashed line. The depicted position of the network 426 is arbitrary and independent of the cash acceptance and cash collection functions.

Cash is accepted into the transaction kiosk 402 by a user for the purposes of paying bills. Upon insertion of the bill notes, the bulk note acceptor validates the bill note and either accepts or rejects the bill. Accepted bills are deposited into the kiosk vault at which point the cash becomes part of the surety bank vault cash. As the user inputs a transaction selection and account identification information, the transaction kiosk 402 records the transaction information locally in a kiosk database 404 for transmission via the network 426 to the transaction processor system 406. Transaction data stored in the kiosk database 404 may include the user's name, identification number (e.g., social security number, driver's license, or telephone number), transaction date, transaction time, creditor name, account number, validated cash deposit amount, a kiosk identification number, and a transaction number. This transaction data is transmitted to the transaction processor system 406 for inclusion in a daily transaction report database 408.

In order to complete the bill payment transaction at the transaction kiosk 402, the transaction processor system 406 may query the identified creditor system 418 via the network 426 to request a balance due amount for the user's account. The creditor system 418 transmits balance information for the user's account stored in the creditor database 420 to the transaction processor system 406. The transaction processor system 406 also queries an internal business rule database 410 to determine the appropriate transaction fee to be charged for the bill payment service. The account balance and transaction fee information is then transmitted from the transaction processor system 406 to the transaction kiosk 402 via the network 426.

The transaction processor system 406 may create a transaction report database 408 with individual records corresponding to each bill payment transaction and including information from each of the kiosk database 404, the creditor database 420, and the business rules database 410. Each transaction record may include fields such as transaction number, customer name, account number, payment amount, fee amount, total deposit amount, tax (if applicable), and other fields. The transaction processor 406 may periodically transmit transaction reports to each of the creditor systems 418 and the surety bank system 414, for example, on a daily basis. Alternatively, the transaction report database 408 may be regularly accessible by the surety bank system 414 or creditor systems 418 over the network 426. The transaction reports may be stored in the creditor system 418 in the creditor database 416 and in a surety bank database 416 in the surety bank system 414 for later reconciliation purposes.

In an exemplary implementation, the transaction processor system 406 may deliver two transactions reports via the network 426 to the surety bank system 414 daily, e.g., at 3:00 PM and 6:00 PM. The 3:00 PM report contains transaction records for all transactions from a first group of creditors. A second group of creditor transaction records with later posting times is transmitted in the 6:00 PM file. Each record in the transaction report may contain, for example, the following fields. The values following each field are sample values.

Kiosk ID: 10253
Transaction Date/Time: 2005-01-28 17:50:14.093000000
Sequence Number: 2064215
Account: Cash (other options: Check/Credit Card/Debit Card)
Transaction Description: CREDITOR NAME Bill Payment
Transaction Amount: 94
Fee: 3
Card Number: 48011

A sample transaction file is then as follows:
10253,2005-01-28,17:50:14.093000000,2064215,Cash, CREDITOR NAME Bill Payment,94,3,48011.

Upon receipt of the transaction files, the surety bank system 414 may import the daily transaction reports into a surety bank database 416 for use in an automated tracking system (e.g., a TRAKKERT™ system available from Palm Desert National Bank) and update the surety bank vault cash totals. Business rules built into the tracking system may used to calculate daily automated clearinghouse (ACH) system reporting information from the creditor systems 418. The business rules applied determine the transaction cutoff times, the number of days in arrears, revenue share arrangements, and convenience fees. ACH reporting is generated and cross-checked against a daily electronic data interchange (EDI) file received from the transaction processor system 406 with current business rules values from the business rules database 410 before importing ACH totals into ACH software and transmitting ACH totals to creditor systems 418 using the transaction processor system 406.

While user accounts with the creditors are settled by the surety bank system 414 on the basis of the transaction reports, including validated cash deposit amounts at the transaction kiosk 402, the cash deposited at the transaction kiosk 402 is at some point physically collected. Cash collection is generally performed by an armored services agent 422 as indicated in FIG. 4 on the right side of the dashed line. The armored services agent 422 manually collects and clears cash from the vault in the transaction kiosk 402, swaps cash cassettes to restock the bill dispensers, resets kiosk counters, resets the time stamp, transports cash to an armored services vault, counts the cash collected, reconciles the collected cash with deposit information from the transaction kiosk 402, and deposits the collected cash with a correspondent bank. The armored services agent 422 enters the collected cash amount into a cash collection database 424. Information in the cash collection database 424 is either transmitted to or is accessible by the transaction processor system 406 or the surety bank system 414 over the network 426.

The surety bank system 414 compares the cash collection data with the validated cash deposit amounts provided in the daily transaction reports to reconcile the vault cash amount determined at the time of the user's deposit at the transaction kiosk 402 with the cash collected and counted by the armored services agent 422. Any discrepancies between the collected cash data and the validated cash deposits are reported by the surety bank system 414 to the transaction processor. In one configuration, the transaction processor system 406 may maintain a message system that facilitates reconciliation functions. The message system may store the cash collection data from the armored services agent 422 and discrepancy amounts from the surety bank system 416 in a message system database 412 and provide an interchange for identifying and resolving any reconciliation issues. In the event that a discrepancy is not resolved and the collected cash is less that the validated cash deposit amount, the surety bank system 414 may file a claim with the armored services agent 422 for the balance. The armored service agent 422 is generally contractually and fiducially responsible for any cash shortages.

The surety bank system 414 uses the daily transaction report data to make payments to creditors on behalf of users depositing cash in the transaction kiosks 402 and using the bill payment functions. Payments may be made to the creditor systems 418 by the surety bank system 414 over the network 426 via electronic funds transfer. The surety bank system 414 also uses the daily transaction report data and business rules data to allocate revenue from the convenience fees charged to the user between the transaction processor, the surety bank, and potentially the creditors as well. Revenue shares may be contractually determined between these parties and may fluctuate based upon the amount of the convenience fee charged and particular terms of contracts with respective creditors. The surety bank system 414 may make payments to the transaction processor system 418 or others over the network 426 via electronic funds transfer.

Figure 5:
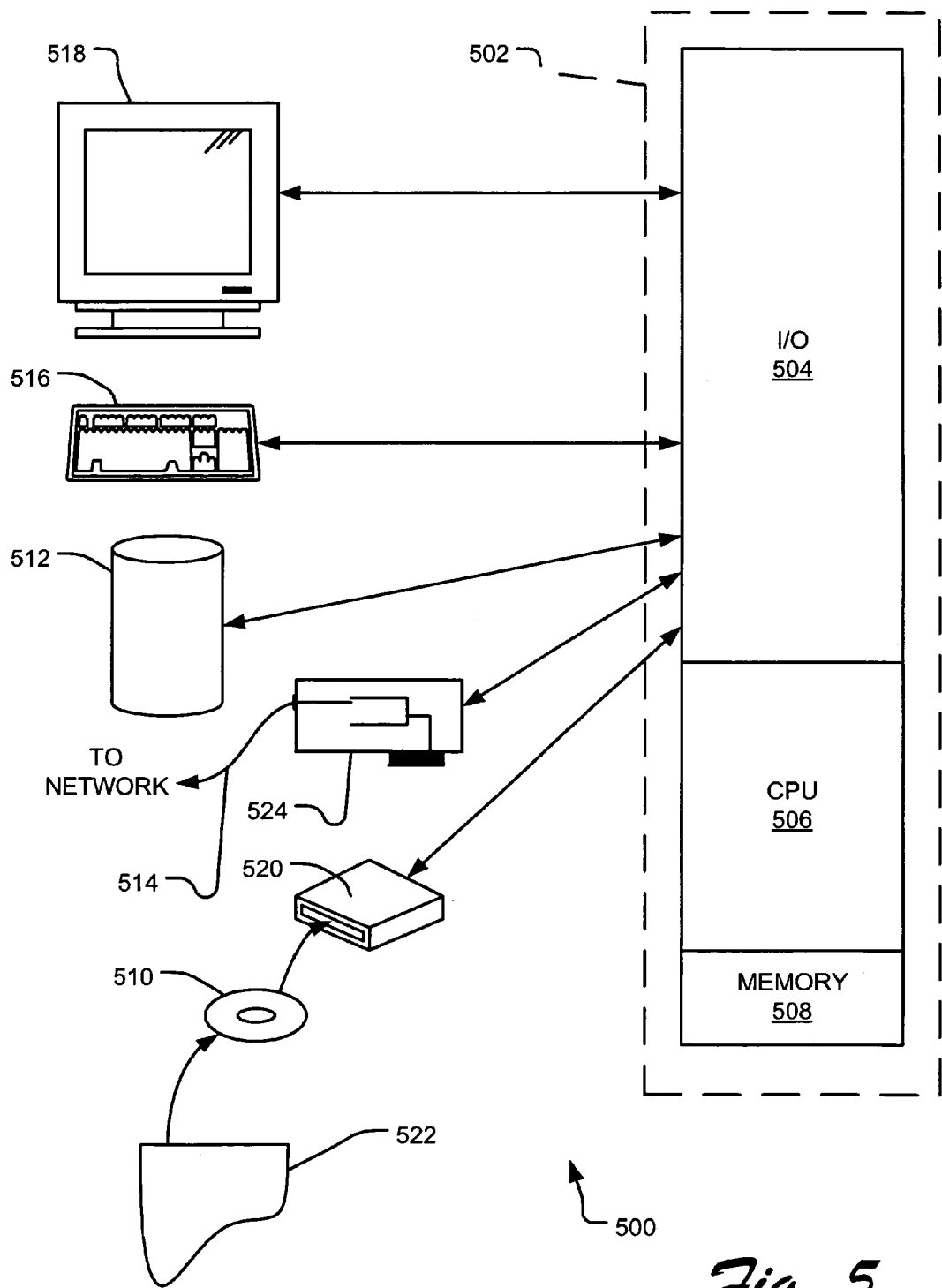
FIG. 5 illustrates an exemplary environment of data exchange for settling an account of a user via a transaction kiosk.

FIG. 5 illustrates an exemplary system that may be useful in implementing the described technology. A general purpose computer system 500 is capable of executing a computer program product to execute a computer process. Each of the surety bank 136, the correspondent bank 140, the transaction processor 122, the creditors 126, and the transaction kiosk 104 depicted in the exemplary system of FIG. 1 may use a general purpose computer system 500, or particular instantiations thereof, connected to a common network such as depicted in FIG. 5 in order to implement the operations and complete the transactions described herein. Data and program files may be input to the computer system 500, which reads the files and executes the programs therein. Some of the elements of a general purpose computer system 500 are shown in FIG. 5 wherein a processor 502 is shown having an input/output (I/O) section 504, a central processing unit (CPU) 506, and a memory section 508. There may be one or more processors 502, such that the processor 502 of the computer system 500 comprises a single central-processing unit 506 or a plurality of processing units, commonly referred to as a parallel processing environment. The computer system 500 may be a conventional computer, a distributed computer, or any other type of computer. The described technology is optionally implemented in software devices loaded in memory 508, stored on a configured DVD/CD-ROM 510, or storage unit 512, and/or communicated via a wired or wireless network link 514 on a carrier signal, thereby transforming the computer system 500 in FIG. 5 into a special purpose machine for implementing the described operations.

The I/O section 504 is connected to one or more user-interface devices (e.g., a keyboard 516 and a display unit 518), a disk storage unit 512, and a disk drive unit 520. Generally, in contemporary systems, the disk drive unit 520 is a DVD/CD-ROM drive unit capable of reading the DVD/CD-ROM medium 510, which typically contains programs and data 522. In accordance with an implementation, software instructions and data directed toward implementing the described transactions for a transaction kiosk and associated operations may reside on the disk storage unit 512, disk drive unit 520, or other storage medium units coupled to the system. These software instructions may also be executed by the CPU 506. Implementing the general purpose computer system 500 as part of a transaction kiosk can involve extensive use of the I/O section 504. The transaction kiosk's input receivers (e.g., a currency collector 118, keypad 108, and magnetic card reader 110 as depicted in FIG. 1) may be connected to the I/O section 504. The transaction kiosk's output devices (e.g., a cash dispenser 112 and a receipt printer 114 as depicted in FIG. 1) can also be connected to the I/O section 504.

Computer program products containing mechanisms to effectuate the systems and methods in accordance with the described technology may reside in the memory section 508, on a disk storage unit 512, or on the DVD/CD-ROM medium 510 of such a system 500. Alternatively, a disk drive unit 520 may be replaced or supplemented by a floppy drive unit, a tape drive unit, or other storage medium drive unit. The network adapter 524 is capable of connecting the computer system 500 to a network via the network link 514, through which the computer system 500 can receive instructions and data embodied in a carrier wave. Examples of such systems include SPARC systems offered by Sun Microsystems, Inc., personal computers offered by Dell Corporation and by other manufacturers of Intel-compatible personal computers, PowerPC-based computing systems, ARM-based computing systems, and other systems running a UNIX-based or other operating system. It should be understood that computing systems may also embody devices, for example, personal digital assistants (PDAs), mobile phones, gaming consoles, and set top boxes.

When used in a LAN environment, the computer system 500 is connected (by wired connection or wirelessly) to a local network through the network interface or adapter 524, which is one type of communications device. When used in a WAN environment, the computer system 500 typically includes a modem, a network adapter, or any other type of communications device for establishing communications over the WAN. In a networked environment, program modules depicted relative to the computer system 500 or portions thereof, may be stored in a remote memory storage device. It is appreciated that the network connections shown are exemplary and other means of and communications devices for establishing a communications link between the computers may be used.

The technology described herein may be implemented as logical operations and/or modules in one or more systems. The logical operations may be implemented (1) as a sequence of processor-implemented steps executing in one or more computer systems and (2) as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

Although various embodiments of this invention have been described above with a certain degree of particularity, or with reference to one or more individual embodiments, those skilled in the art could make numerous alterations to the disclosed embodiments without departing from the spirit or scope of this invention. Connection references e.g., attached, coupled, connected, and joined are to be construed broadly and may include intermediate members between a collection of elements and relative movement between elements unless otherwise indicated. As such, connection references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the basic elements of the invention as defined in the following claims.

What is claimed is:

1. A method of allocating moneys owned and controlled by a bank, the method comprising:
    validating a first amount of a cash deposit by a user at a remote transaction location using a processor, wherein the remote transaction location comprises a kiosk;
    physically securing the cash deposit at the transaction location, wherein physically securing further comprises holding the cash deposit within a vault in the kiosk; and
    transmitting data including the first amount from the remote transaction location to the bank to update a record of a second amount of cash available to the bank to satisfy depositor claims by including the first amount of the cash deposit physically secured at the remote transaction location within the second amount;
    wherein the ownership of the vault and the cash deposit therein are separated from the ownership of other physical assets of the kiosk, and the vault and the cash deposit therein are owned by the bank.

2. The method of claim 1 further comprising leveraging the first amount to secure a payment on behalf of the user to a creditor of the user.

3. The method of claim 1, wherein the record is updated before the cash deposit is physically removed from the remote transaction location.

4. A method for settlement of an account of a debtor with a creditor by a bank on behalf of the debtor, the method comprising:
    validating a first amount of a cash deposit by the debtor at a transaction location using a processor wherein the transaction location comprises a kiosk;
    physically securing the cash deposit in a vault within the kiosk, wherein the ownership of the vault and the cash deposit therein are separated from the ownership of other physical assets of the kiosk, and the vault and the cash deposit therein are owned by the bank;
    transmitting data including the first amount from the transaction location to the bank to update a record of a second amount of cash available to the bank to satisfy depositor claims by including the first amount of the cash deposit physically secured at the transaction location within the second amount; and
    transmitting a confirmation from the transaction location to the creditor in settlement of the account of the debtor with the creditor by the bank on behalf of the debtor, wherein the settlement is secured by the validated first amount of the cash deposit while the deposit is physically secured at the transaction location.

5. The method of claim 4, wherein the record is updated before the cash deposit is physically removed from the transaction location.

6. The method of claim 4, wherein the step of transmitting the confirmation further comprises transmitting the confirmation to the creditor.

7. The method of claim 4 further comprising transmitting data regarding the settlement from the transaction location to the bank.

8. The method of claim 4 further comprising receiving data identifying a balance of the account of the debtor from the creditor.

9. The method of claim 4 further comprising charging a transaction fee to the debtor.

10. The method of claim 4 further comprising returning a third amount to the debtor, wherein the third amount is the difference between the first amount, a balance of the account of the debtor, and any transaction fee.

11. The method of claim 10, wherein the third amount is returned to the debtor in the form of a prepaid convenience card.

12. The method of claim 4 further comprising allocating a portion of the second amount of cash to settle the account of the debtor.

13. A method of allocating moneys owned and controlled by a bank, the method comprising
    receiving data at the bank from a transaction location via a network, the data including a first amount of a cash deposit by a user validated and physically secured at the transaction location, wherein the transaction location comprises a kiosk having a vault and wherein the ownership of the vault and the cash deposit therein are separated from the ownership of other physical assets of the kiosk, and the vault and the cash deposit therein are owned by the bank; and
    updating a record of a second amount of cash available to the bank using a processor to satisfy depositor claims by including the first amount of the cash deposit physically secured at the remote transaction location within the second amount.

14. The method of claim 13 further comprising receiving data identifying a balance of the account from the creditor.

15. The method of claim 13 further comprising receiving notification at the bank of a confirmation issued to a creditor that the bank will, on behalf of the user, settle an account of the user with the creditor, wherein settlement is secured by the first amount of the cash deposit.

16. The method of claim 15 further comprising remitting payment by the bank to the creditor with funds from the second amount in settlement of the account of the user.

17. The method of claim 13, wherein the record is updated before the cash deposit is physically removed from the transaction location.

18. A method for settlement of an account of a debtor with a creditor by a bank on behalf of the debtor, the method comprising
receiving a first set of data from a transaction location via a network, the first set of data including a first amount of a cash deposit by the debtor validated and physically secured at the transaction location, wherein the transaction location comprises a kiosk having a vault and wherein the ownership of the vault and the cash deposit therein are separated from the ownership of other physical assets of the kiosk, and the vault and the cash deposit therein are owned by the bank; and
transmitting data including the first amount to the bank via the network using a processor to update a record of a second amount of cash available to the bank to satisfy depositor claims by including the first amount of the cash deposit physically secured at the transaction location within the second amount.

19. The method of claim 18 further comprising
receiving a second set of data from the transaction location via the network, the second set of data including a request to pay an account of the debtor with a creditor;
transmitting a confirmation to the creditor that the bank will, on behalf of the debtor, settle the account of the debtor with the creditor, wherein settlement is secured by the first amount of the cash deposit.

20. The method of claim 19 further comprising transmitting notification of the confirmation to the bank.

21. The method of claim 19 further comprising transmitting rules concerning transaction fee amounts and/or allocations to the bank.

22. The method of claim 19 further comprising
receiving a third set of data identifying a balance of the account of the debtor from the creditor; and
transmitting the third set of data to the transaction kiosk via the network.

23. The method of claim 18, wherein the data including the first amount is transmitted to the bank before the cash deposit is physically removed from the transaction location.

* * * * *